Oct. 12, 1954  W. L. MORRIS  2,691,300
TORQUE COMPUTER
Filed Dec. 17, 1951
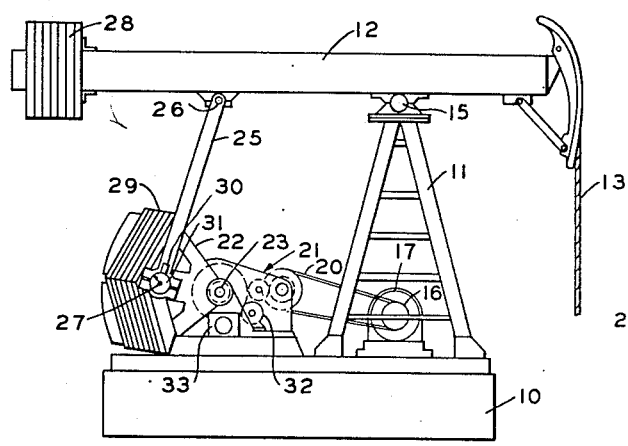
FIG. 1
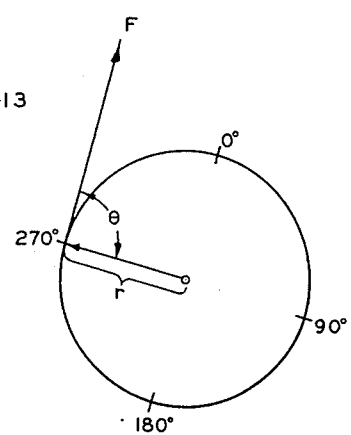
FIG. 2
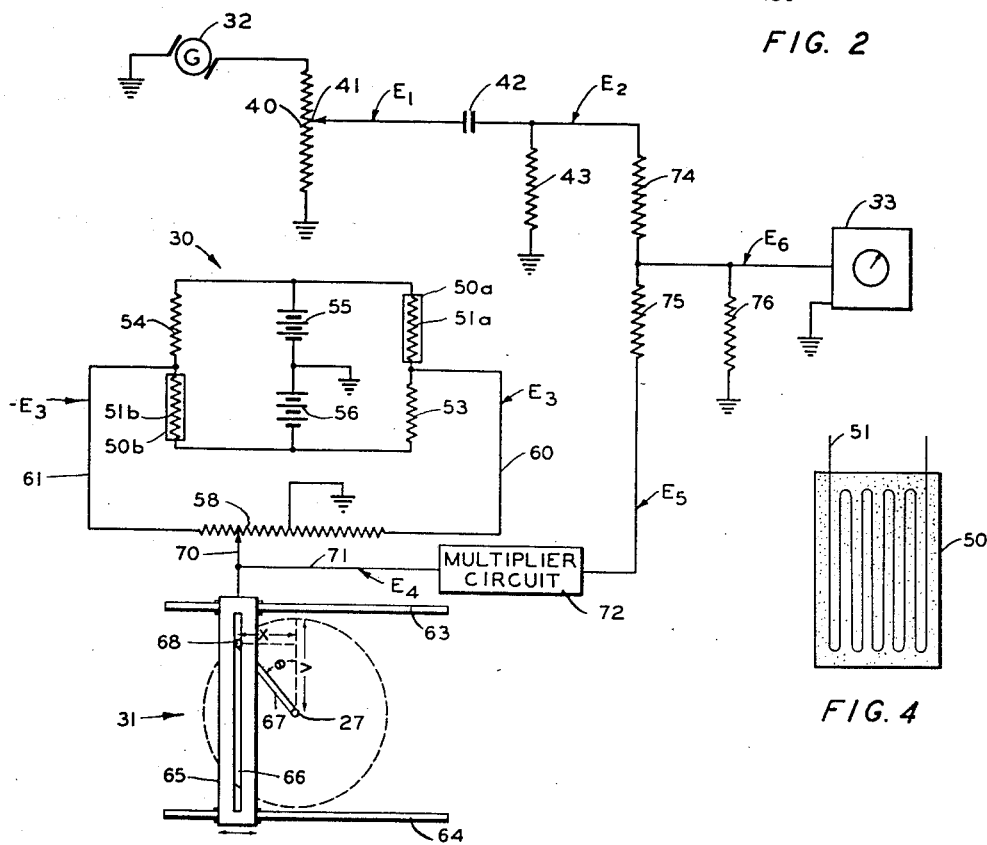
FIG. 3
FIG. 4
INVENTOR.
W.L. MORRIS
BY Hudson & Young
ATTORNEYS Patented Oct. 12, 1954

2,691,300

UNITED STATES PATENT OFFICE 2,691,300

TORQUE COMPUTER

William L. Morris, Idaho Falls, Idaho, assignor to Phillips Petroleum Company, a corporation of Delaware Application December 17, 1951, Serial No. 262,008

11 Claims. (Cl. 73—136)

This invention relates to torque measuring means. In one specific aspect it relates to a method of measuring the instantaneous torque exerted on the drive shaft of a rotating body. In another specific aspect it relates to apparatus for computing the instantaneous torque exerted on the drive shaft of the crank arm of a sucker rod well pumping unit.

The sucker rod well pumping unit is a mechanical system that is quite elastic in structure. Such a system includes a string of small diameter connecting rods extending as much as a mile or more below the surface of the earth to a plunger pump which is actuated by suitable surface equipment comprising a walking beam, counterweights, a rotating crank arm, a pitman connecting said crank arm with said walking beam, a prime mover, and driving means connecting said crank arm with said prime mover. Although sucker rod pumping units have been employed in oil fields for many years, due to the elasticity of the system, satisfactory methods of dynamic analysis have not been available which can serve to predict the numerous possibilities as to variance in peak and average loads with regard to pumping speed or stroke length. When the pump was used only at shallow depths and slow speeds, the quasi-static method of analysis, whereby kinetic forces were neglected, was sufficiently accurate for all practical purposes. However, as deeper fields have been located and as there has become a premium for more rapid rate of operation, the quasi-static analysis has not proved to be satisfactory. Moreover, the dynamic approach to the problem is one of such complexity that its analysis by conventional methods is not feasible.

A number of empirical formulae have been proposed for use in studying the operation of sucker rod pumping units, and within the range of observed data the results obtained generally have been quite satisfactory. However, when it has become necessary to obtain solutions by extrapolation outside the range of observed data, the results have not been dependable. Recently, the problem has been attacked from the point of view of designing mechanical and electrical simulators to aid in the study of the operation of these pumping units. In this respect, one important quantity that must be measured is the total instantaneous torque exerted on the crank shaft which operates the pumping unit. In order to obtain such a torque measurement there is provided, in accordance with the present invention, an electrical circuit wherein voltages are established proportional to the various components of the total torque exerted on the crank shaft. By summing and recording these individual voltages there is obtained a continuous representation of the total torque acting on the crank shaft.

Accordingly, it is an object of this invention to provide computing means for calculating the total instantaneous torque exerted on the drive shaft of a rotating body.

Another object is to provide electrical networks analogous to the various forces and torques exerted on a moving body.

A further object is to provide a method of computing the total torque exerted on the drive shaft of the crank arm of a well pumping unit.

A still further object is to provide electrical computing means for calculating the torque exerted on the drive shaft of the crank arm of a well pumping unit.

Various other objects, advantages, and features of this invention should become apparent to those skilled in the art from the following detailed description taken in conjunction with the accompanying drawing in which:

Figure 1 illustrates torque measuring apparatus in conjunction with a sucker rod pumping unit;

Figure 2 is a diagram of the forces exerted on the crank arm of the sucker rod pump;

Figure 3 is a schematic view of the electrical and mechanical network employed to calculate the total instantaneous torque exerted on the drive shaft of the crank arm shown in Figure 1; and Figure 4 illustrates a suitable strain gage for measuring one of the forces applied to the crank arm.

Referring now to the drawing in detail and to Figure 1 in particular, there is illustrated a typical sucker rod pumping unit including a base 10 upon which rests a Sampson post 11 supporting a walking beam 12. A cable 13 is secured at its upper end to walking beam 12, and at its lower end to the sucker rods, not shown. Walking beam 12 is oscillated about a suitable pivot bearing 15 positioned on top of Sampson post 11 by means of the force supplied to said walking beam 12 by prime mover 16, which may be either an internal combustion engine or an electrical motor 17. Prime mover 16 is connected by means of a drive belt 20 to suitable speed reduction gears 21 which rotate crank arm 22 about crank shaft 23, this entire assembly being supported on base 10. Crank arm 22 is connected to walking beam 12 by means of pitman 25 which is secured to walking beam 12 at its upper end by pitman pin 26 and to crank arm 22 at its lower end by crank pin 27. Walking beam 12 and crank arm 22 each are provided with suitable counterweights 28 and 29, respectively, to assist in maintaining a fairly constant load at all times on motor 17. It should be noted that the sucker rod pumping unit may have any one of several different arrangements based upon the same mechanical principles. The application of this invention is not limited by the type of pumping unit.

In order to measure the total instantaneous torque exerted upon crank shaft 23 there is provided in accordance with this invention electrical apparatus for establishing and indicating voltages representative of the individual torques exerted thereon. This apparatus can take the form of a strain gage unit 30 and a sine function potentiometer unit 31 mounted on pitman 25, a direct current generator 32 rotated with crank arm 22, and a recording meter 33. These circuit elements, together with various electrical connecting means, are illustrated schematically in network relationship in Figure 3. The various voltages applied to meter 33 are transmitted between the moving members of Figure 1 through suitable brushes and slip rings, not shown.

From an observation of the sucker rod pumping unit shown in Figure 1, it should be apparent that the total torque exerted upon crank shaft 23 is the sum of two terms: the first being the product of the moment of inertia of crank arm 22 and the angular acceleration of said crank arm, and the second being the torque exerted by the force pitman 25 acting on crank arm 22. This second torque term is illustrated schematically in Figure 2 wherein the radius of crank arm 22 to the point of contact with pitman 25 at pin 27 is represented by $r$, and pitman 25 is represented as a force $F$ acting at an angle $\theta$ with crank arm 22. The torque exerted by pitman 25 on shaft 23, therefore, is expressed by the term:

$$Fr \sin \theta \qquad (1)$$

Accordingly, the total instantaneous torque (T) exerted upon crank shaft 23 is equal to $$T = Fr \sin \theta + I\alpha \qquad (2)$$

where $I$ represents the moment of inertia of crank arm 22 and $\alpha$ is the angular acceleration of said crank arm.

An electrical circuit adapted to provide voltages representative of these various force factors is illustrated schematically in Figure 3. The term $I\alpha$ is established by a voltage taken from direct current generator 32, having one output terminal thereof grounded, which is driven by the gears 21 which drive crank arm 22. In this manner the output voltage of generator 32, which is applied across potential divider 40, is of magnitude proportional to the angular velocity $\omega$ of crank arm 22. The contactor 41 of potential divider 40 is positioned at some preselected point representative of the moment of inertia of crank arm 22, with the result that voltage $E_1$, taken at said contactor with respect to ground, is proportional to $I\omega$. Voltage $E_1$ is applied to a differentiating circuit consisting of capacitor 42 and resistor 43, one terminal of which is grounded, so that the output voltage $E_2$, also taken with respect to ground, is proportional to the derivative of input voltage $E_1$ with respect to time. Since $\alpha$ is defined as being equal to $$\frac{d\omega}{dt}$$

it should be apparent that voltage $E_2$ is representative of the torque term $I\alpha$ in Equation 2.

Strain gage 30 is secured to pitman 25 in a manner so as to provide a voltage representative of the force F exerted by said pitman 25 on crank arm 22. A pair of like strain gages 50a and 50b, illustrated in Figure 4 as gage 50, each comprise a filament of very fine metallic wire 51, the electrical strain characteristics of which are predetermined. Wire 51 can be formed of any suitable material such as "constantan," "Advance," or other well known alloys or metals having good resistance properties, as well as being adapted for fabrication in small wire sizes. Resistance wires 51a and 51b of strain gages 50a and 50b, respectively, are sealed to the surface of pitman 25 by a suitable bonding material such as "Glyptal," in positions such that wires 51a and 51b lie almost entirely along the longitudinal axis of pitman 25, that is, in the direction of the force exerted on crank arm 22.

Strain gage unit 30 is in the form of an electrical bridge network having two parallel arms: the first of which consists of series connected strain gage 50a and a first resistor 53, the second consisting of series connected second resistor 54 and strain gage 50b. A voltage source in the form of like series connected batteries 55 and 56, the common junction of which is maintained at ground potential, is applied across both arms of the bridge circuit. A linear potentiometer, having its center point maintained at ground potential, has one end terminal connected to the junction between strain gage 50a and resistor 53 by lead 60 and the second end terminal connected to the junction between resistor 54 and strain gage 50b by lead 61.

In the described embodiment of this invention, resistors 53 and 54 each have equal ohmic resistance, which resistance in turn is equal to the ohmic resistance of each of wires 51a and 51b under the condition of zero strain being applied thereto. Thus, it should be evident that under the condition of zero strain being exerted on pitman 25, the bridge circuit of unit 30 is in a condition of electrical balance. At balance, equal current flows from battery unit 55, 56 through each of the parallel resistance paths, which results in leads 60 and 61 being maintained at the same potential. The electrical resistance R of either strain gage can be defined as $$R = CL_0(1 + Fb) \qquad (3)$$

where $L_0$ is the initial length of the associated resistance wire with zero force F being applied thereto, and $C$ and $b$ are constants. Accordingly, as force F increases, resistance R increases. Any positive, i. e. tensile, force applied to pitman 25 results in an increase in resistance in wires 51a and 51b, which in turn creates an unbalanced condition in the bridge circuit. A negative or compressive force results in a decrease in resistance in wires 51a and 51b. Because of symmetry of the bridge circuit in unit 30 it should be apparent that the potential of lead 60 increases by an amount equal to the decrease in potential of lead 61 when a positive force F is applied to pitman 25. The instantaneous potentials at leads 60 and 61, taken with respect to ground, are designated by $E_3$ and $-E_3$, respectively. Potentials $E_3$ and $-E_3$ are applied to opposite end terminals of potentiometer 58.

In order to provide a voltage proportional to the sine of the angle θ which pitman 25 makes with the central radial line on crank arm 22 to the point of engagement with pitman 25, the potentiometer unit 31 illustrated in Figure 3 is employed. A pair of parallel guide rails 63 and 64 are secured to pitman 25 on opposite sides of crank pin 27. A bar 65 having a longitudinal slot 66 formed therein is mounted for translational movement on guide rails 63 and 64. Slot 66 thus extends longitudinally of pitman 25. An arm 67 is attached to crank arm 22 at point 27 in a manner so as to extend radially outward from crank shaft 23 at all times in the direction the central radial line of crank arm 22 extends from shaft 23. Attached to the extremity of arm 67 is a pin 68 which engages slot 66 of bar 65. As arm 67 rotates about pin 27 the horizontal displacement X of pin 68 from a vertical line longitudinally of pitman 25 through pin 27 is at all times proportional to sin θ, where θ is the angle between arm 67 and vertical radius line V of the circle defined by the rotation of pin 68. From Figure 3 it can be seen that $$X = V \sin \theta \quad (4)$$

A rider 70 is mounted on the upper end of bar 65 along the longitudinal axis thereof in a manner so as to make slidable contact with potentiometer 58. The overall arrangement of units 30 and 31 is such that the center point of potentiometer 58 lies along vertical line V extended. The displacement of rider 70 from the grounded center tap of potentiometer 58 is obviously proportional to sin θ at all times.

Rider 70 is connected to the input of a multiplier circuit 72 by means of lead 71. The voltage $E_4$ at lead 71, taken with respect to ground, is proportional to $F \sin \theta$ since the voltage applied across potentiometer 58 is proportional to force F. In order to establish a voltage proportional to the term $Fr \sin \theta$ in Equation 2, it is necessary that voltage $E_4$ be multiplied by the factor $r$. This is accomplished by multiplier circuit 72, which can be in the form of a voltage divider similar to potentiometer 40, or in the form of a conventional voltage multiplier or amplifier if it is desired to increase the relative magnitude of the output voltage. The output voltage $E_5$ from circuit 72, therefore, is representative of the term $Fr \sin \theta$.

As previously described, voltage $E_2$ is representative of the term $I\alpha$. Accordingly, the sum of voltages $E_5$ and $E_2$ is representative of the total torque T as defined in Equation 2. This addition is accomplished by connecting voltage points $E_2$ and $E_5$ through resistors 74 and 75, respectively; the common junction therebetween being grounded through resistor 76. Voltage $E_6$, taken across resistor 76, is equal to the sum of voltages $E_2$ and $E_5$. This voltage sum $E_6$ is indicated and recorded on meter 33 which can be any conventional recording instrument.

From the foregoing description it should be apparent that the electrical circuitry of Figure 3 is particularly adapted to produce an output voltage $E_6$ which is proportional to the total torque on the crank shaft 23 of the pumping unit illustrated in Figure 1 in accordance with Equation 2. While the electrical circuitry of Figure 3 is that of a present preferred embodiment of this invention, it is to be understood that various modifications in the circuit elements employed as well as the overall network arrangement can be made by those skilled in the art without departing from the scope of my invention. This invention obviously is not limited to the precise circuit arrangement herein described.

I claim:

1. Apparatus for measuring the instantaneous torque exerted on the shaft of a rotating body, comprising in combination, first means responsive to the rotation of said body for establishing an electrical quantity representative of the product of the moment of inertia and angular acceleration of said rotating body, second means responsive to external forces acting on said body for establishing a second corresponding electrical quantity representative of the instantaneous torque exerted on the shaft of said body by external forces acting thereon, and means responsive to said first and second means for measuring the sum of said established electrical quantities.

2. Apparatus for measuring the instantaneous torque exerted on the shaft of a rotating body, comprising in combination, first means responsive to the rotation of said body for establishing a voltage representative of the product of the moment of inertia and angular acceleration of said rotating body, second means responsive to external forces acting on said body for establishing a second voltage representative of the instantaneous torque exerted on the shaft of said body by external forces acting thereon, and means responsive to said first and second means for measuring the sum of said voltages.

3. In a sucker rod pumping unit including a walking beam, a rotating crank arm mounted on a crank shaft, and a pitman connecting said walking beam to said crank arm; apparatus for measuring the instantaneous torque exerted on said crank shaft, comprising in combination, first means responsive to the rotation of said crank shaft for establishing a first voltage representative of the product of the moment of inertia and the angular acceleration of said crank arm, second means responsive to external forces acting on said crank shaft for establishing a second voltage representative of the torque exerted by said pitman on said crank shaft, and means responsive to said first and second means for measuring the sum of said first and second voltages.

4. The combination in accordance with claim 3 wherein the circuit means for establishing said first voltage comprises an electrical generator driven by said crank arm to provide a voltage proportional to the angular velocity of said crank arm, means for regulating said generated voltage to provide a voltage proportional to the product of the angular velocity and moment of inertia of said crank arm, and circuit means for differentiating said regulated generator voltage with respect to time to provide a voltage proportional to the product of the angular acceleration and moment of inertia of said crank arm.

5. The combination in accordance with claim 4 wherein one terminal of said generator is grounded; said means for regulating said generated voltage comprises a potentiometer having one end terminal thereof connected to the second terminal of said generator, the second end terminal of said potentiometer being grounded; and said differentiating circuit comprises a capacitor having one terminal thereof connected to the contactor of said potentiometer, and a resistor having one terminal thereof connected to the second terminal of said capacitor, the second terminal of said resistor being grounded, said differentiated voltage being taken across said resistor.

6. The combination in accordance with claim 3 wherein the circuit means for establishing said second voltage comprises a strain responsive resistance element mounted on said pitman, a bridge circuit including said strain responsive element, a potentiometer having its end terminals connected across opposite terminals of said bridge circuit whereby the voltage applied across said potentiometer is proportional to the force exerted by said pitman, means for picking a voltage off said potentiometer which is proportional to the sine of the angle the longitudinal axis of said pitman makes with the longitudinal axis of said crank arm, and means for multiplying the voltage pick off said potentiometer by a factor representative of the radius of the crank arm to the point of contact with said pitman.

7. The combination in accordance with claim 6 wherein said bridge circuit comprises a voltage source applied across two parallel arms thereof, the first arm of which includes an electrical resistance strain responsive element and a first resistor connected in series, the second arm of which includes a second resistor and a second electrical resistance strain responsive element connected in series, said resistors being disposed in non-adjacent arms of said bridge circuit, said elements being mounted in parallel relation on said pitman, said potentiometer having one end terminal thereof connected between said first element and said first resistor and the second end terminal thereof connected between said second resistor and said second element.

8. The combination in accordance with claim 6 wherein said means for picking a voltage off said potentiometer comprises a rod coupled to said crank arm for rotational movement therewith, said rod having one end thereof fixed, a bar having a longitudinal slot therein, said bar being constrained for translational movement normally to the longitudinal slot therein, the free end of said rod engaging said longitudinal slot whereby the displacement of said bar from a reference line parallel to said longitudinal slot and intersecting the fixed end of said rod is proportional to the sine of the angle said rod makes with said reference line, and means connecting the contactor of said potentiometer with said bar whereby the magnitude of voltage between the contactor of said potentiometer and a reference point is proportional to the sine of said angle.

9. Apparatus for measuring the instantaneous torque exerted by a rotating body on its drive shaft as represented by the product of the amount of inertia and instantaneous angular acceleration of said body, comprising in combination, an electrical generator driven at a velocity proportional to the angular velocity of said rotating body to provide a first voltage proportional to the instantaneous angular velocity of said rotating body, means for multiplying said first voltage by a factor representative of the moment of inertia of said rotating body, and means for differentiating said multiplied voltage with respect to time to provide an output voltage proportional to the product of the moment of inertia and angular acceleration of said rotating body.

10. Apparatus for measuring the instantaneous torque exerted by a rotating body on its drive shaft as represented by the product of the moment of inertia and instantaneous angular acceleration of said body, comprising in combination, a direct current generator driven at a velocity proportional to the angular velocity of said rotating body, a potentiometer having the output voltage of said generator applied thereacross, the contactor of said potentiometer being positioned with respect to one end terminal of said potentiometer to provide an output voltage therebetween proportional to the product of the moment of inertia and angular velocity of said rotating body, and a resistor-capacitor differentiating circuit, the input voltage thereof being taken from said potentiometer, the output voltage thereof being proportional to the product of moment of inertia and angular acceleration of said rotating body.

11. In a sucker rod pumping unit including a walking beam, a rotating crank arm positioned on a crank shaft, and a pitman connecting said walking beam to said crank arm; apparatus for measuring the instantaneous torque exerted on said crank shaft, comprising in combination; means for establishing a first voltage representative of the product of the moment of inertia and angular acceleration of said crank arm comprising an electrical generator driven by said crank arm to provide a voltage proportional to the angular velocity of said crank arm, means for varying the output voltage of said generator to provide an adjusted voltage proportional to the product of the angular velocity and moment of inertia of said crank arm, and circuit means for differentiating said adjusted voltage with respect to time to provide said first voltage; means for establishing a second voltage representative of the torque exerted on said crank shaft by said pitman comprising a strain gage unit secured to said pitman, said strain gage unit providing an output voltage proportional to the tension on said pitman, a linear potentiometer, the output voltage of said strain gage unit being applied across the end terminals of said potentiometer, means for positioning the contactor of said potentiometer in accordance with the sine of the angle said pitman makes with said crank arm, and means for multiplying the voltage between the contactor of said potentiometer and a reference point by a factor representative of the radius of said crank arm to the point of contact with said pitman; and circuit means for summing said first and second voltages to provide a voltage proportional to the total instantaneous torque exerted on said crank shaft.

References Cited in the file of this patent

UNITED STATES PATENTS

| Number | Name | Date |
|---|---|---|
| 2,362,616 | Cloud | Nov. 14, 1944 |

OTHER REFERENCES

Physics, Hausmann and Slack, 2nd edition, by Van Nostrand Co., N. Y., pp. 74, 75, 100 and 101.

Elements of Machine Design, Kimball and Barr, 2nd edition, by John Wiley & Sons, N. Y., pp. 6–17.

Design of Machine Members, Valance and Doughtie, 3rd edition, McGraw-Hill Book Co. Inc., N. Y. 1951, p. 433.